US011338907B2

(12) United States Patent
Young

(10) Patent No.: US 11,338,907 B2
(45) Date of Patent: May 24, 2022

(54) ACTUATION ASSEMBLIES FOR FLIGHT CONTROL SURFACES

(71) Applicant: The Boeing Company, Chicago, IL (US)

(72) Inventor: Stuart David Young, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 110 days.

(21) Appl. No.: 16/887,164

(22) Filed: May 29, 2020

(65) Prior Publication Data
US 2021/0371086 A1 Dec. 2, 2021

(51) Int. Cl.
B64C 13/28 (2006.01)
B64C 9/00 (2006.01)

(52) U.S. Cl.
CPC ............... B64C 13/28 (2013.01); B64C 9/00 (2013.01)

(58) Field of Classification Search
CPC .............. B64C 13/28; B64C 9/00; B64C 9/02
See application file for complete search history.

(56) References Cited

U.S. PATENT DOCUMENTS

| 2,959,066 | A | 11/1960 | Bailey et al. |
| 4,995,575 | A | 2/1991 | Stephenson |
| 5,163,534 | A | 11/1992 | Hillman |
| 7,190,096 | B2 | 3/2007 | Blanding et al. |
| 7,834,494 | B2 | 11/2010 | Blanding et al. |
| 7,883,059 | B2 | 2/2011 | Kunz |
| 8,033,500 | B1 | 10/2011 | Charafeddine et al. |
| 8,104,721 | B2 | 1/2012 | Pohl |
| 8,191,824 | B2 | 6/2012 | Shaheen et al. |
| 9,963,220 | B2 | 5/2018 | Ishihara et al. |

(Continued)

FOREIGN PATENT DOCUMENTS

| CA | 3033754 A1 * | 9/2019 | ............. B64C 13/30 |
| DE | 4009549 | 9/1991 | |

(Continued)

OTHER PUBLICATIONS

Printout of Thomson Linear Slides product information on linear slides, downloaded from ThomsonLinear.com website on Aug. 18, 2017.
Hagen et al., "The X-38 V-201 Flap Actuator Mechanism," Proceedings of the 37th Aerospace Mechanisms Symposium, Johnson Space Center, May 19-21, 2004.
Machine-generated English translation of the abstract of DE4009549, downloaded from Espacenet.com on Dec. 31, 2018.
(Continued)

Primary Examiner — Rodney A Bonnette
(74) Attorney, Agent, or Firm — Dascenzo Gates Intellectual Property Law, P.C.

(57) ABSTRACT

Actuation assemblies comprise a track comprising a first roller surface, a second roller surface opposite the first roller surface, and a curved section. Actuation assemblies further comprise a carriage operatively coupled to a flight control surface, a first roller rotatably supported by the carriage and comprising a first-roller rolling surface engaged with the first roller surface, a second roller rotatably supported by the carriage and comprising a second-roller rolling surface engaged with the second roller surface, and an actuator, whose distal end is operatively coupled to the carriage to selectively translate the carriage along the track and thus to selectively translate the first roller along the first roller surface and the second roller along the second roller surface.

20 Claims, 6 Drawing Sheets

(56) References Cited

U.S. PATENT DOCUMENTS

| | | |
|---|---|---|
| 10,234,012 B1 | 3/2019 | Latif |
| 10,443,696 B1 | 10/2019 | Latif et al. |
| 10,611,462 B2 | 4/2020 | Young |
| 2009/0146014 A1* | 6/2009 | Gyuricsko ............ F16C 23/041 244/213 |
| 2011/0042525 A1* | 2/2011 | Parker ....................... B64C 9/16 244/213 |
| 2012/0012696 A1* | 1/2012 | Sakurai .................... B64C 9/16 244/99.3 |
| 2017/0174313 A1* | 6/2017 | Brakes ...................... B64C 3/28 |
| 2018/0194454 A1 | 7/2018 | Olson et al. |
| 2019/0055002 A1 | 2/2019 | Bekircan |
| 2019/0101197 A1 | 4/2019 | Gavriliuc et al. |

FOREIGN PATENT DOCUMENTS

| | | | |
|---|---|---|---|
| EP | 2433863 | 3/2012 | |
| JP | H08211173 | 8/1996 | |
| WO | WO-2018197265 A1 * | 11/2018 | ............... B64C 9/02 |

OTHER PUBLICATIONS

Machine-generated English translation of the abstract of JPH08211173, provided with European Search Report for related European Application No. 18178047, dated Dec. 4, 2018.
Installation guide for HepcoMotion precision ring and track systems, 2015.

* cited by examiner

ACTUATION ASSEMBLIES FOR FLIGHT CONTROL SURFACES

FIELD

The present disclosure relates to actuation assemblies for flight control surfaces.

BACKGROUND

Current flap actuation assemblies on commercial aircraft are heavy and have many moving parts. Typically, a roller and channel arrangement is used, requiring a nominal clearance between the roller and channel, which results in build-up of grease, grime, and grit and thus in increased friction and maintenance. Accordingly, there is a need for simpler mechanisms for actuation of flight control surfaces, such as flaps.

SUMMARY

Actuation assemblies for flight control surfaces, aircraft, and associated methods are disclosed.

Actuation assemblies are for moving a flight control surface of an aircraft relative to a support structure of the aircraft. Actuation assemblies comprise a track, a carriage, a first roller, a second roller, and an actuator. The track is configured to be operatively fixed relative to the support structure and comprises a first roller surface, a second roller surface opposite the first roller surface, and a curved section, in which the first roller surface and the second roller surface are curved. The carriage is configured to be operatively coupled to the flight control surface. The first roller is rotatably supported by the carriage and comprises a first-roller rolling surface engaged with the first roller surface. The second roller is rotatably supported by the carriage and comprises a second-roller rolling surface engaged with the second roller surface. The actuator comprises a proximal end that is configured to be operatively fixed relative to the support structure, and a distal end that is configured to be selectively translated away from and toward the proximal end. The distal end is operatively coupled to the carriage to selectively translate the carriage along the track and thus to selectively translate the first roller along the first roller surface and the second roller along the second roller surface.

Aircraft comprise a fuselage, a wing supported by the fuselage, and a tail supported by the fuselage. The wing or the tail comprises a support structure, a flight control surface, and an actuation assembly coupled to the support structure. The carriage of the actuation assembly is operatively coupled to the flight control surface for operative movement of the flight control surface relative to the support structure.

Methods of moving a flight control surface of an aircraft comprise rolling rollers along opposing roller surfaces of a track that comprises a curved section. The flight control surface is operatively coupled to the rollers.

DESCRIPTION

Figure 1:
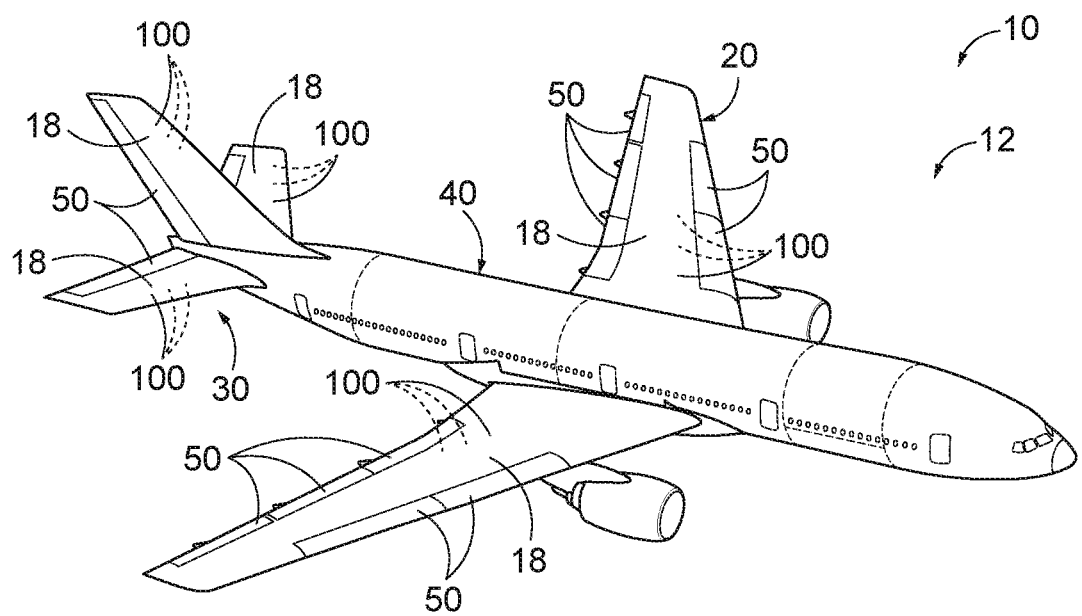
FIG. 1 is an illustration of an example aircraft.

FIGS. 1-9 provide illustrative, non-exclusive examples of actuation assemblies 100 and/or aircraft 10, of components thereof, and/or associated methods, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

Figures 2, 3:
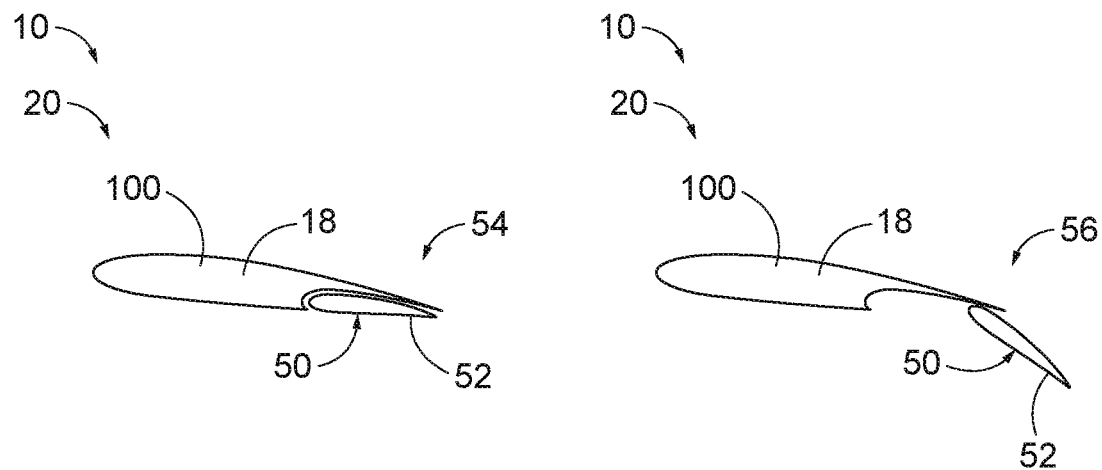
FIG. 2 is a schematic profile view of an aircraft wing with a flight control surface in a retracted configuration.
FIG. 3 is a schematic profile view of an aircraft wing with a flight control surface in an extended configuration.

FIG. 1 is a schematic representation of an aircraft 10 that may include and/or utilize actuation assemblies 100. While aircraft 10 is depicted as a fixed-wing airliner, aircraft 10 and use of actuation assemblies 100 according to the present disclosure are not limited to such examples, aircraft 10 may include fixed wing aircraft, commercial aircraft, military aircraft, passenger aircraft, autonomous aircraft, rotorcraft, etc. Aircraft 10 typically include wings 20 and a tail 30 that are attached to a fuselage 40 to form and/or define an airframe 12. Wings 20 and tail 30 include a plurality of flight control surfaces 50 that are configured to be selectively moved relative to support structures 18 of the wings 20 or tail 30. Examples of support structures include spars, ribs, or other underlying framework of a wing 20 or a tail 30. Flight control surfaces 50 are adapted, configured, sized, shaped, and/or designed to be selectively moved relative to a support structure 18 and actuated between a retracted configuration 54, as illustrated in FIG. 2, and an extended configuration 56, as illustrated in FIG. 3. Retracted configuration 54 additionally or alternatively may be described as a stowed configuration, and extended configuration 56 additionally or alternatively may be described as a deployed configuration. Actuation of flight control surfaces 50 changes one or more aerodynamic characteristics of aircraft 10 in any suitable and/or desired manner. Actuation of flight control surfaces 50 may be facilitated, controlled, and/or regulated by one or more actuation assemblies 100, examples of which are disclosed herein. As an example, each flight control surface 50 may be actuated by one or more actuation assemblies 100. In a specific example, first and second actuation assemblies 100, which may be spaced apart and/or distinct from one another, may be operatively coupled to a single flight control surface 50 and/or may be configured to cooperatively transition the flight control surface 50 between the retracted and extended configurations.

Actuation assemblies 100 may be adapted, configured, designed, sized, and/or constructed to move flight control surfaces 50 through, or throughout, a control surface rangeof-motion. As an example, actuation assemblies 100 may be configured to move flight control surfaces 50 between a retracted configuration 54, as illustrated in FIG. 2, and an extended configuration 56, as illustrated in FIG. 3. In this example, the control surface range-of-motion may be defined between the retracted configuration 54 and the extended configuration 56.

Flight control surfaces 50 may include and/or be any suitable control surface for an aircraft. As an example, and as illustrated in FIGS. 2-3, a flight control surface 50 may include and/or be a flap 52. In some examples, as discussed herein, flap 52 may be a Fowler flap. Additional examples of flight control surfaces 50 include stabilizers, elevators, rudders, spoilers, slats, ailerons, and flaperons.

Figure 4:
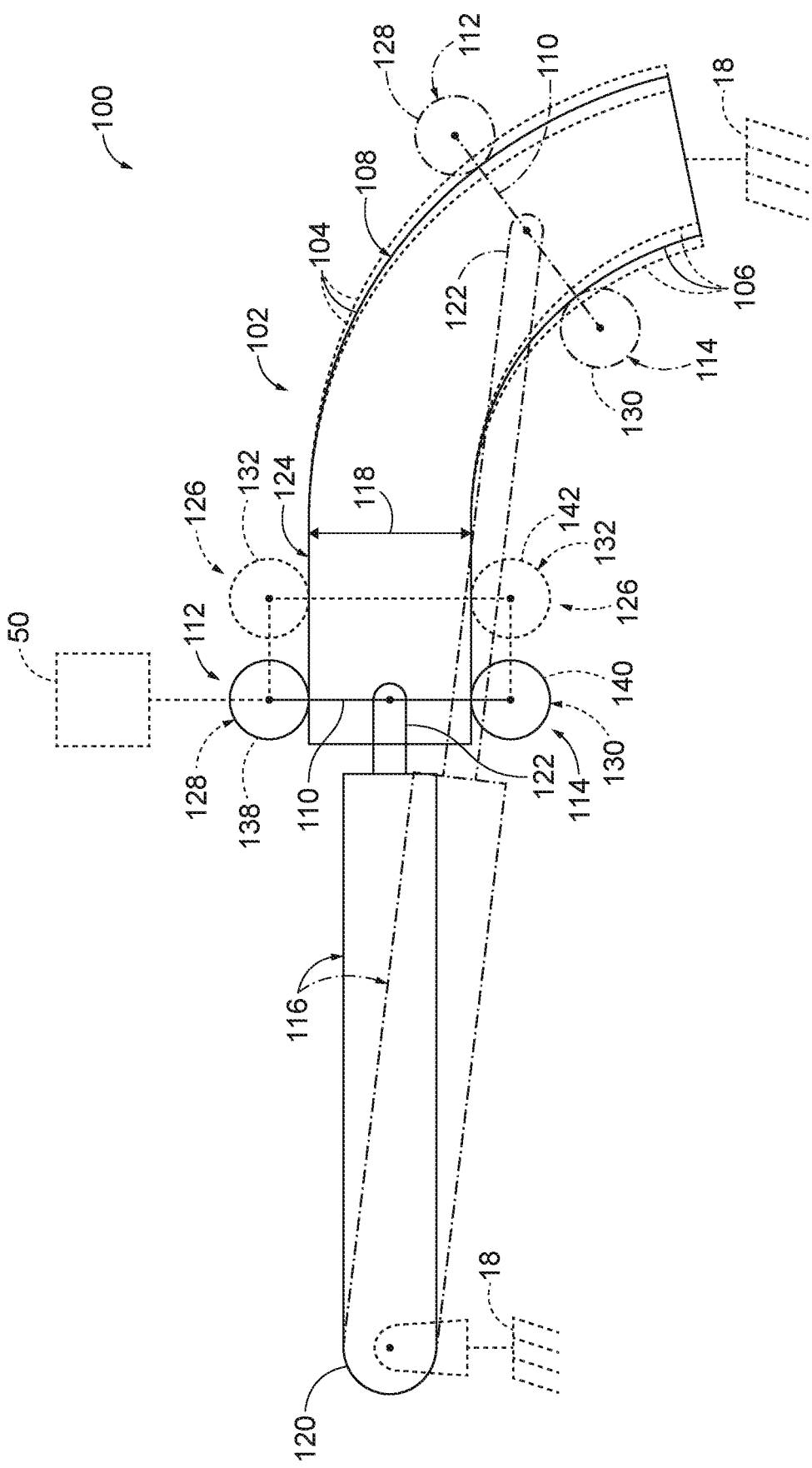
FIG. 4 is a schematic side-view diagram representing actuation assemblies according to the present disclosure.
Figure 5:
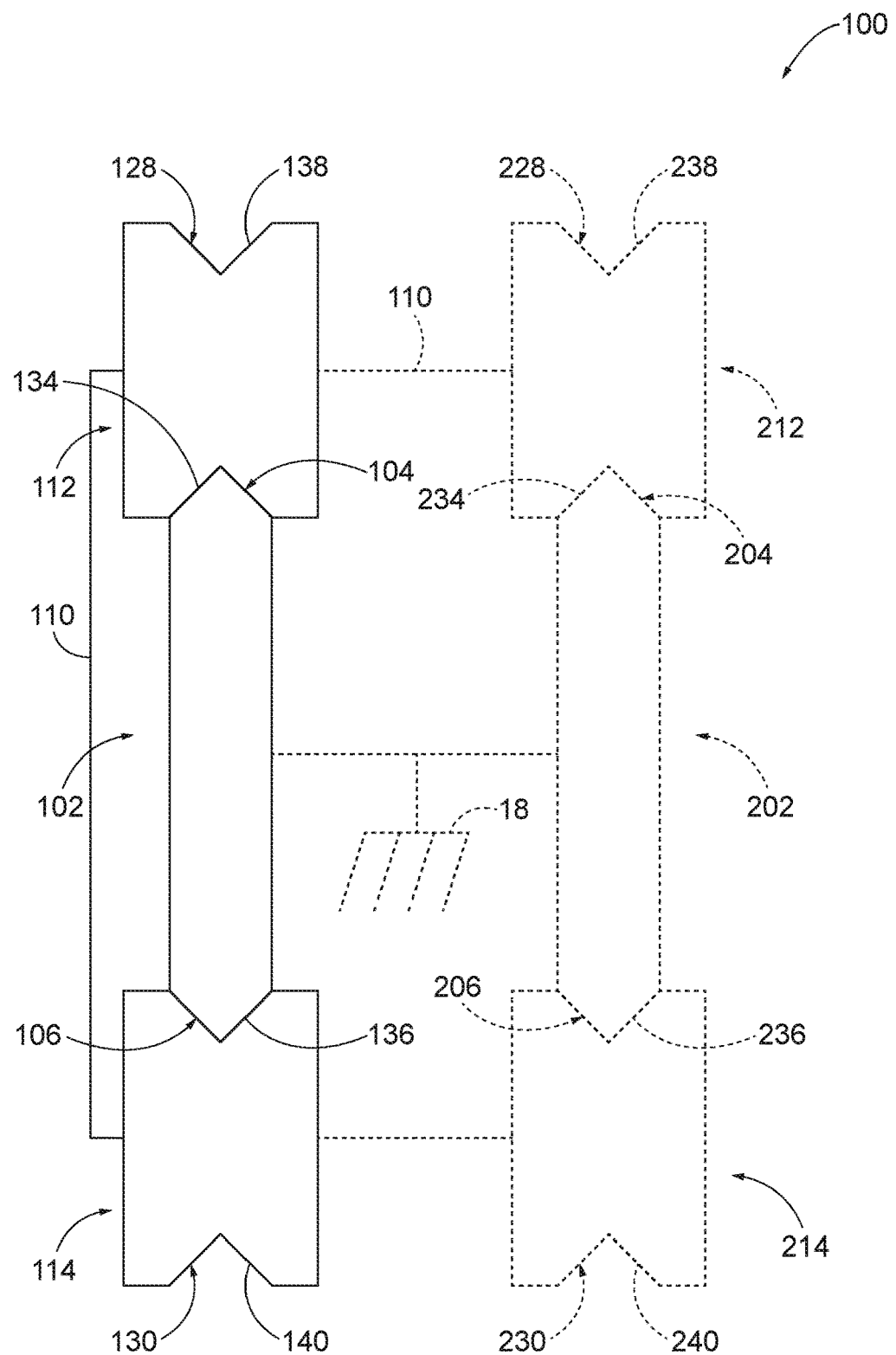
FIG. 5 is a schematic end-view diagram representing actuation assemblies according to the present disclosure.
Figure 6:
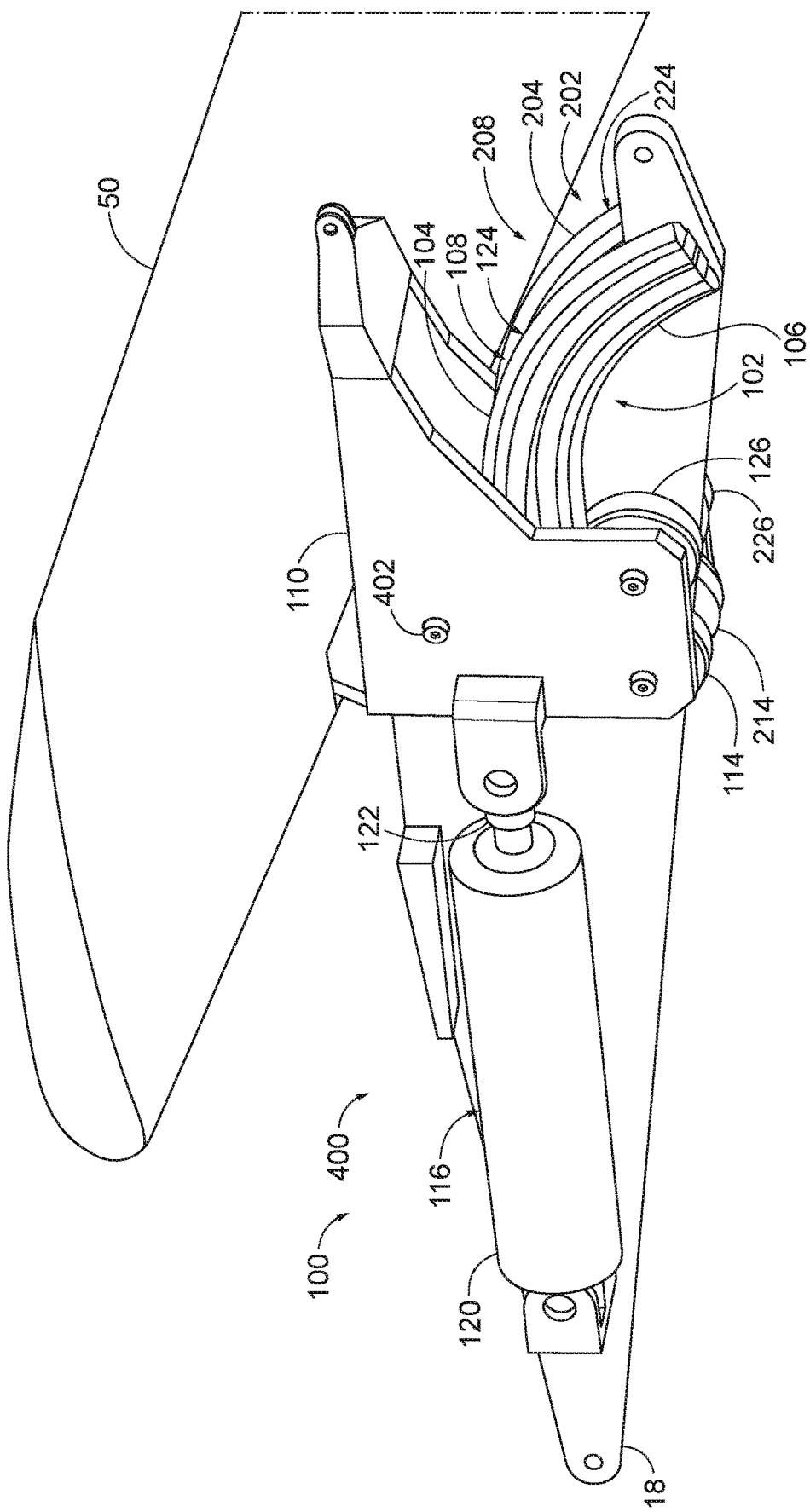
FIG. 6 is a perspective view of an example actuation assembly according to the present disclosure, shown in a stowed configuration.
Figure 7:
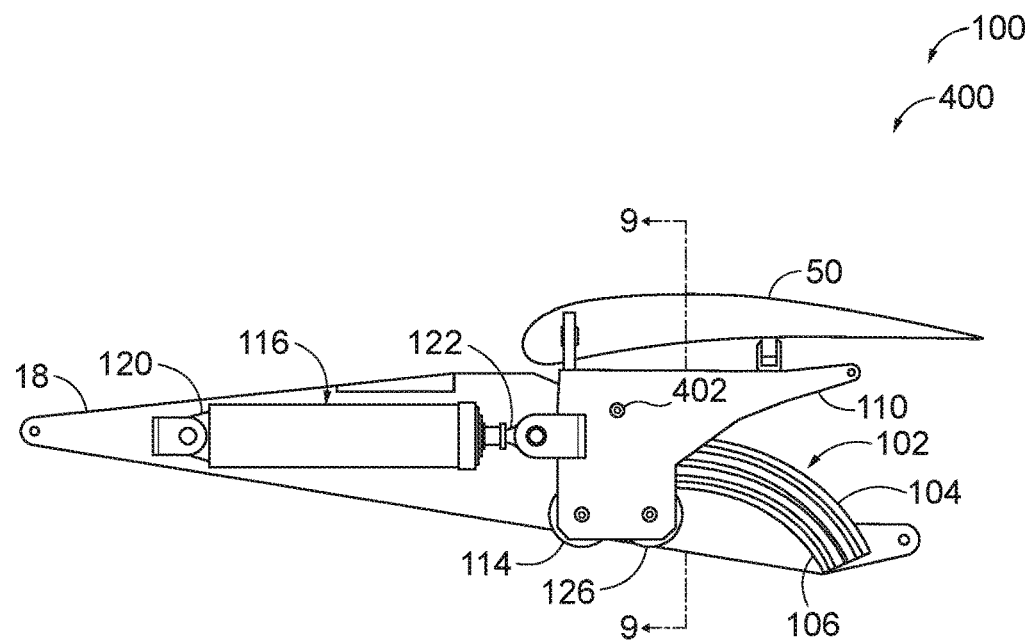
FIG. 7 is a side view of the example actuation assembly of FIG. 6, shown in the retracted configuration.
Figure 8:
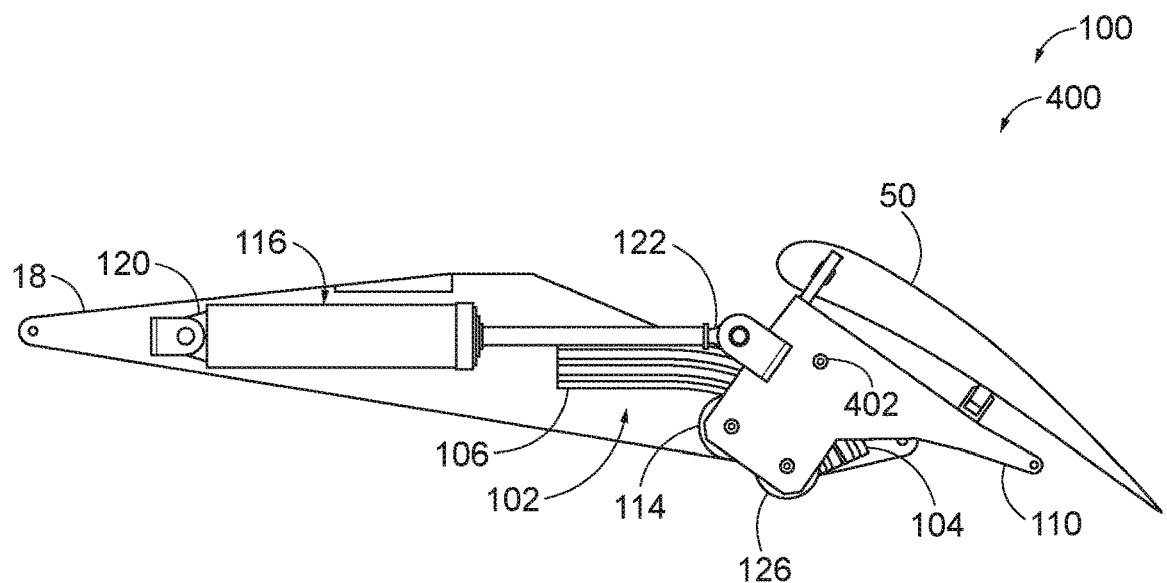
FIG. 8 is a side view of the example actuation assembly of FIG. 6, shown in an extended configuration.
Figure 9:
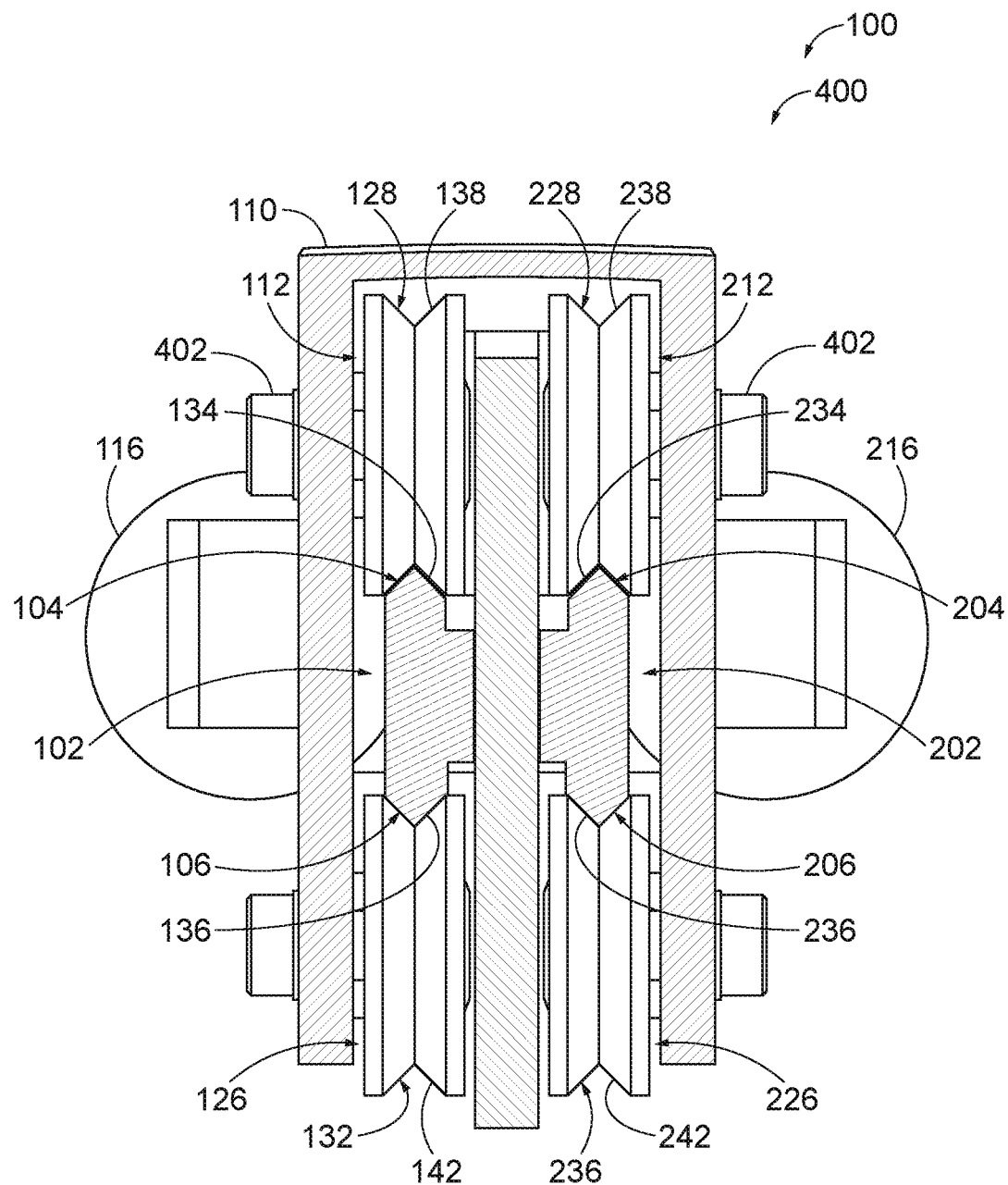
FIG. 9 is a cross-sectional end view of the example actuation assembly of FIG. 6, taken along line 9-9 in FIG. 7.

Turning now to FIGS. 4 and 5, actuation assemblies 100 according to the present disclosure are schematically represented. In general, in FIGS. 4 and 5, elements that are likely to be included in a given (i.e., a particular) example, or embodiment, of an actuation assembly 100 are illustrated in solid lines, while elements that may be included in only some examples are illustrated in dashed lines. However, elements that are shown in solid lines are not essential to all examples, and an element shown in solid lines may be omitted from a particular example without departing from the scope of the present disclosure.

As schematically shown in FIG. 4, actuation assemblies 100 comprise at least a track 102, a carriage 110, a first roller 112, a second roller 114, and an actuator 116. The track 102 is configured to be operatively fixed relative to a support structure 18, such as a spar or rib of a wing 20 or a tail 30, for example. Additionally or alternatively, the support structure 18 may be a component of the actuation assembly 100, such as a bracket, that is configured to be operatively fixed to underlying framework of a wing or a tail. When installed in an aircraft, the track 102 is operatively fixed relative to a support structure 18 and the underlying framework of a wing or a tail.

The track 102 comprises a first roller surface 104 and a second roller surface 106 opposite the first roller surface 104 and thus may be described as a double-sided track and/or as a mono-track. The first roller 112 is rotatably supported by the carriage 110 and comprises a first-roller rolling surface 128 that is engaged with the first roller surface 104 for operative rolling therealong. Similarly, the second roller 114 is rotatably supported by the carriage 110 and comprises a second-roller rolling surface 130 engaged with the second roller surface 106 for operative rolling therealong. In some examples, one or both of the first roller 112 or the second roller 114 comprises an adjustable non-concentric bushing that is configured to be selectively adjusted to tighten the corresponding roller against the track. Accordingly, because the rollers are coupled to the carriage 110, when the non-concentric bushing(s) is/are adjusted, the axes of the rollers are cinched toward the track, and a desired tolerance between the rollers and the track is achieved. In some examples, when three rollers are included, as discussed herein, including a single roller on one side of the track 102 and two rollers on the opposite side of the track 102, the single roller comprises an adjustable non-concentric bushing.

The track 102 comprises a curved section 108, in which the first roller surface 104 and the second roller surface 106 are curved. Specifically, the curvature of the curved section 108 of the track 102 is selected to create a desired movement of the flight control surface 50 that is associated with the actuation assembly 100 between its retracted configuration 54 and its extended configuration 56.

The carriage 110 is configured to be operatively coupled to a flight control surface 50 for actuation thereof, that is, for actuation of flight control surface 50 between its retracted configuration 54 and its extended configuration 56 as the carriage 110 moves along the track 102. That is, when the actuation assembly 100 is operatively installed on an aircraft, the carriage 110 is operatively coupled to a flight control surface 50. Accordingly, actuation assemblies 100 also may be described as having a retracted configuration and an extended configuration. In FIG. 4, actuation assemblies 100 are represented in solids lines in the retracted configuration and in dash-dot lines in the extended configuration.

Because the track 102 is double-sided with rollers 112, 114 positioned on the opposing roller surfaces 104, 106, desired tight tolerances may be maintained between the rollers 112, 114 and the track 102, with the rollers 112, 114 operatively rolling along the respective surfaces 104, 106 as the actuation assembly 100 transitions between the retracted and extended configurations. Accordingly, friction and wear to the moving parts of actuation assemblies 100 is minimized, thereby reducing maintenance thereof compared to prior art assemblies, in which rollers are positioned within a two-sided channel, as opposed to a double-sided track.

The actuator 116 comprises a proximal end 120 that is configured to be operatively fixed relative to a support structure 18. That is, when installed in an aircraft, the proximal end 120 is operatively fixed relative to a support structure 18. The actuator 116 further comprises a distal end 122 that is configured to be selectively translated away from and toward the proximal end 120. The distal end 122 is operatively coupled to the carriage 110 to selectively translate the carriage 110 along the track 102 and thus to selectively translate the first roller 112 along the first roller surface 104 and the second roller 114 along the second roller surface 106. In other words, the actuator 116 causes the actuation assembly 100 to transition between its retracted configuration and its extended configuration, and thus, when installed, causes a flight control surface 50 to transition between its retracted configuration and its extended configuration. Actuators 116 additionally or alternatively in some examples may be referred to as linear actuators and/or reciprocating actuators. Any suitable types of actuators 116 may be used, including, for example, hydraulic cylinders, pneumatic cylinders, ball screw assemblies, hydraulic power drives, geared rotary actuators, etc.

Depending on the geometry of the track 102, and in particular on the curved section 108 thereof, and the mounting location of the proximal end 120 of the actuator 116 relative to the track 102, the actuator 116 may pivot about the proximal end 120 as the actuation assembly 100 transitions between the retracted configuration and the extended configuration, as schematically represented in FIG. 4. In some examples, the geometry of the track 102 and the mounting location of the proximal end 120 may be selected to minimize the pivoting of the actuator 116, such as to minimize the friction and wear seen by the proximal end 120 of the actuator 116. In some examples, the actuation assembly 100 is configured such that the actuator 116 pivots less than 5° relative to a support structure 18 when the actuation assembly transitions between the retracted configuration and the extended configuration.

In addition, in some examples, the actuator 116 may be mounted closer to the associated flight control surface 50 than in prior art assemblies, thereby reducing the torque imparted to the actuator 116 as the actuation assembly 100 transitions between the retracted configuration and the extended configuration. That is, actuation assemblies 100 provider a greater mechanical advantage than prior art assemblies, and as a result the actuator 116 and thus the actuator assemblies 100 as a whole are lighter and require less energy to operate than prior art assemblies.

The track 102 may be described as having a width 118 between the first roller surface 104 and the second roller surface 106. As schematically illustrated in dashed lines in FIG. 4, in some examples, within the curved section 108, the width 118 tapers. In some such examples, the width 118 decreases away from the proximal end 120 of the actuator 116 within the curved section 108. In other examples, the width 118 increases away from the proximal end 120 of the actuator 116.

As also schematically illustrated in dashed lines in FIG. 4, some actuation assemblies 100 further comprise a third roller 126 that is rotatably supported by the carriage 110 and that comprises a third-roller rolling surface 132 that is engaged with one of the first roller surface 104 or the second roller surface 106.

In some such examples, and in particular in examples in which the width 118 of the curved section 108 of the track 102 decreases away from the proximal end 120 of the actuator 116, the first roller surface 104 is an outer surface of the curved section 108 and the second roller surface 106 is an inner surface of the curved section 108 within the curved section 108 of the track 102, and the third-roller rolling surface 132 is engaged with the second roller surface 106. That is, in such examples, the third roller 126 is engaged with the same surface of the track 102 as is the second roller 114. As used herein, an inner surface of the curved section 108 is the roller surface of the track 102 that is closer to the centers of curvature of the curved section's roller surfaces, and the outer surface of the curved section 108 is the roller surface of the track 102 that is further away from the centers of curvature of the curved section's roller surfaces. Stated differently, the inner surface may be described as being a concave surface, and the outer surface may be described as being convex. Stated differently, the inner surface corresponds to the side of the track toward which the curved section 108 is curved. However, the inner surface does not necessarily have a smaller radius of curvature, such as depending on the tapering of the width 118 of the curved section 108, as discussed herein.

In some such examples, during operative translation of the carriage 110 along the curved section 108 of the track 102, axes of the first roller 112, the second roller 114, and the third roller 126 are fixed relative to the carriage 110 during operative translation of the carriage 110 along the track 102, the first-roller rolling surface 128 maintains operative engagement with the first roller surface 104, and the second-roller rolling surface 130 and the third-roller rolling surface 132 maintain operative engagement with the second roller surface 106. In other words, the rollers 112, 114, 126 are fixed relative to the carriage 110, and for the rollers 112, 114, 126 to maintain operative engagement with the track 102, the width 118 of the track 102 decreases in the curved section 108 away from the proximal end 120 of the actuator 116. Stated differently, the curvature of the first roller surface 104 and the curvature of the second roller surface 106 are selected to ensure that the rollers 112, 114, 126 maintain operative contact with the track 102 during full movement of the carriage 110 along the track 102, and in particular within the curved section 108 thereof.

In other examples, and in particular in examples in which the width 118 of the curved section 108 of the track 102 increases away from the proximal end 120 of the actuator 116, the first roller surface 104 is the outer surface of the curved section 108 and the second roller surface 106 is the inner surface of the curved section 108, and the third-roller rolling surface 132 is engaged with the first roller surface 104. That is, in such examples, the third roller 126 is engaged with the same surface of the track 102 as is the first roller 112. In some such examples, during operative translation of the carriage 110 along the curved section 108 of the track 102, axes of the first roller 112) the second roller 114, and the third roller 126 are fixed relative to the carriage 110, the first-roller rolling surface 128 and the third-roller rolling surface 132 maintain operative engagement with the first roller surface 104, and the second-roller rolling surface 130 maintains operative engagement with the second roller surface 106. In other words, the rollers 112, 114, 126 are fixed relative to the carriage 110, and for the rollers 112, 114, 126 to maintain operative engagement with the track 102, the width 118 of the track 102 increases in the curved section 108 away from the proximal end 120 of the actuator 116. Stated differently, the curvature of the first roller surface 104 and the curvature of the second roller surface 106 are selected to ensure that the rollers 112, 114, 126 maintain operative contact with the track 102 during full movement of the carriage 110 along the track 102, and in particular within the curved section 108 thereof.

In some examples of actuation assemblies 100 that comprise three rollers, axes of the first roller 112, the second roller 114, and the third roller 126 are arranged in an acute triangle. Arrangement in an acute triangle provides for a smooth transition between a straight section 124 of the track 102 and the curved section 108 of the track 102 and throughout the curved section 108.

As schematically represented in FIG. 4, in some examples of actuation assemblies 100, in addition to comprising a curved section 108, the track 102 further comprises a straight section 124. In some examples, the straight section 124 is proximal to the proximal end 120 of the actuator 116 relative to the curved section 108. In some examples, the width 118 of the track 102 is constant within the straight section 124. Actuation assemblies 100 having tracks 102 with straight sections 124 may be used in connection with so-called Fowler flaps. Fowler flaps are arranged to not only pivot relative to the primary airfoil surface of a wing, but also are arranged to translate aft when deployed. Accordingly, when implemented with a Fowler flap, an actuation assembly 100 having a straight section 124, causes the Fowler flap to translate aft as the carriage 110 translates along the straight section 124 of the track, and then to pivot while continuing to translate aft as the carriage 110 translates along the curved section 108 of the track 102.

Turning now to FIG. 5, the first roller surface 104 may be described as having a first-roller-surface profile 134, the second roller surface 106 may be described as having a second-roller-surface profile 136, the first-roller rolling surface 128 may be described as having a first-roller-rolling-surface profile 138 that corresponds to the first-roller-surface profile 134, the second-roller rolling surface 130 may be described as having a second-roller-rolling-surface profile 140 that corresponds to the second-roller-surface profile 136, and when the actuation assembly 100 further comprises a third roller 126, the third-roller rolling surface 132 may be described as having a third-roller-rolling-surface profile 142 that corresponds to one of the first-roller-rolling-surface profile 138 or the second-roller-rolling-surface profile 140 with which the third-roller rolling surface 132 is engaged. In some such examples, the first-roller-rolling-surface profile 138 and the first-roller-surface profile 134 are two-dimensional. Additionally or alternatively, in some examples, the second-roller-rolling-surface profile 140 and the second-roller-surface profile 136 are two-dimensional. In other words, the contours of the roller surfaces match, or align with, or otherwise correspond to the contours of the rolling surfaces at cross-sections that are perpendicular thereto. In some examples, the first-roller-rolling-surface profile 138 and the first-roller-surface profile 134 are V-shaped, and in some examples, the second-roller-rolling-surface profile 140 and the second-roller-surface profile 136 are V-shaped; however, other two-dimensional profiles are within the scope of the disclosure, including, for example curved profiles. Also within the scope of the present disclosure are flanged wheels for use as the rollers. In some examples, the surface profiles of the roller surfaces of the track may be described as being male and the surface profiles of the rolling surfaces of the rollers may be described as being female, with the roller surfaces extending into the rolling surfaces. In other examples, the surface profiles of the roller surfaces of the track may be described as being female and the surface profiles of the rolling surfaces of the rollers may be described as being male, with the rolling surfaces extending into the roller surfaces.

By having the roller surface profiles and the corresponding rolling surface profiles two-dimensional, and optionally V-shaped, the actuation assembly 100 is able to carry a lateral load. That is, if an associated flight control surface 50 imparts a lateral load to the carriage 110, the roller surfaces of the track 102 will counteract the lateral load via the engagement of the roller surfaces with the rolling surfaces of the rollers. The deeper the profile of the roller surfaces and the rolling surfaces, the greater the lateral load that can be carried by an actuation assembly 100.

With continued reference to FIG. 5, some actuation assemblies 100 further comprise a second track 202, a second-track first roller 212, and a second-track second roller 214. The second track 202 is configured to be operatively fixed relative to the support structure 18, and thus when such an actuation assembly is operatively installed on an aircraft, like the track 102, the second track 202 is operatively fixed relative to the support structure 18. When present, the second track 202 is parallel to and corresponds in shape to the track 102. In the words, the second track 202 comprises a curved section 108, and in some examples a straight section 124, that are the same shape as the corresponding sections of the track 102. The second track 202 comprises a second-track first roller surface 204 with a second-track-first-roller-surface profile 234, a second-track second roller surface 206 opposite the second-track first roller surface 204 and with a second-track-second-roller-surface profile 236, and a second-track curved section 208, in which the second-track first roller surface 204 and the second-track second roller surface 206 are curved.

The second-track first roller 212 is coaxial with the first roller 112, is rotatably supported by the carriage 110, and comprises a second-track first-roller rolling surface 228 that is engaged with the second-track first roller surface 204 and that has a second-track-first-roller-rolling-surface profile 238 corresponding to the second-track-first-roller-surface profile 234. The second-track second roller 214 is coaxial with the second roller 114, is rotatably supported by the carriage 110, and comprises a second-track second-roller rolling surface 230 that is engaged with the second-track second roller surface 206 and that has a second-track-second-roller-rolling-surface profile 240 corresponding to the second-track-second-roller-surface profile 236.

When actuation assembly 100 comprises a third roller 126, a second-track third roller 226 is coaxial with the third roller 126, is rotatably supported by the carriage 110, and comprises a second-track third-roller rolling surface 232 that is engaged with one of the second-track first roller surface 204 or the second-track second roller surface 206.

In examples in which the second-track third-roller rolling surface 232 is engaged with the second-track second roller surface 206, axes of the second-track first roller 212, the second-track second roller 214, and the second-track third roller 226 are fixed relative to the carriage 110 during operative translation of the carriage 110 along the second track 202, such that the second-track first-roller rolling surface 228 maintains operative engagement with the second-track first roller surface 204 and such that the second-track second-roller rolling surface 230 and the second-track third-roller rolling surface 232 maintain operative engagement with the second-track second roller surface 206 during operative translation of the carriage 110 along the second track 202.

In examples in which the second-track third-roller rolling surface 232 is engaged with the second-track first roller surface 204, axes of the second-track first roller 212, the second-track second roller 214, and the second-track third roller 226 are fixed relative to the carriage 110 during operative translation of the carriage 110 along the second track 202, such that the second-track first-roller rolling surface 228 and the second-track third-roller rolling surface 232 maintain operative engagement with the second-track first roller surface 204 and such that the second-track second-roller rolling surface 230 maintains operative engagement with the second-track second roller surface 206 during operative translation of the carriage 110 along the second track 202.

Turning now to FIGS. 6-9, an illustrative non-exclusive example of an actuation assembly 100 is illustrated and indicated at 400. Where appropriate, the reference numerals from the schematic illustrations of FIGS. 4 and 5 are used to designate corresponding parts of actuation assembly 400; however, the example of FIGS. 6-9 is non-exclusive and does not limit actuation assemblies to the illustrated embodiment of actuation assembly 400. That is, actuation assemblies 100 are not limited to the specific embodiment of the illustrated actuation assembly 400, and actuation assemblies 100 may incorporate any number of the various aspects, configurations, characteristics, properties, etc. of actuation assemblies 100 that are illustrated in and discussed with reference to the schematic representations of FIGS. 4 and 5 and/or the embodiment of FIGS. 6-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to actuation assembly 400; however, it is within the scope of the present disclosure that the previously discussed features, variants, etc. may be utilized with actuation assembly 400.

Actuation assembly 400 is an example of an actuation assembly 100 that is configured for use with a Fowler flap. Actuation assembly 400 is an example of an actuation assembly 100 that comprises two tracks, that is a track 102 and a second track 202, each with a straight section 124 and a curved section 108, whose width 118 decreases away from the proximal end 120 of the actuator 116. Moreover, actuation assembly 400 is an example of an actuation assembly 100 with three rollers per track, whose axes are arranged in an acute triangle, including two rollers engaged with each of the second roller surface 106 and the second-track second roller surface 206, and a single roller engaged with each of the first roller surface 104 and the second-track first roller surface 204. The single roller comprises a non-concentric adjustable bushing 402. The profiles of the roller surfaces and rolling surfaces of actuation assembly 400 are V-shaped and thus are capable of carrying a lateral load imparted to the carriage 110 via a coupled flight control surface 50. Actuation assembly 400 also comprises a second actuator 216 that is coupled between the support structure 18 and the carriage 110.

Also within the scope of the present disclosure are methods of moving a flight control surface 50 of an aircraft 10, with such methods optionally being implemented, or performed, by an actuation assembly 100. In the discussion of the methods below, reference numerals associated with actuation assemblies 100 are used for clarity; however, such methods are not required to be implemented by an actuation assembly 100.

Specifically, such methods comprise rolling rollers 112, 114, 126 along opposing roller surfaces 104, 106 of a track 102 that comprises a curved section 108, with the flight control surface 50 being operatively coupled to the rollers 112, 114, 126.

In some examples, the track 102 has a width 118 between the opposing roller surfaces 104, 106 that, within the curved section 108, tapers. In some such examples, the track 102 further comprises a straight section 124. In some such examples, the width 118 decreases within the curved section 108 away from the straight section 124. In other such examples, the width 118 increases within the curved section 108 away from the straight section 124.

In some examples, the rollers 112, 114, 126 maintain operative engagement with the track 102 along the curved section 108.

In some examples, the roller surfaces 104, 106 of the track 102 have roller-surface profiles 134, 136, rolling surfaces 128, 130, 132 of the rollers 112, 114, 126 have rolling-surface profiles 138, 140, 142, the roller-surface profiles 134, 136 and the rolling-surface profiles 138, 140, 142 are two-dimensional, and the roller-surface profiles 134, 136 correspond in shape to the rolling-surface profiles 138, 140, 142. In some such examples, the roller-surface profiles 134, 136 and the rolling-surface profiles 138, 140, 142 are V-shaped.

Illustrative, non-exclusive examples of inventive subject matter according to the present disclosure are described in the following enumerated paragraphs:

A. An actuation assembly (100) for moving a flight control surface (50) of an aircraft (10) relative to a support structure (18) of the aircraft (10), the actuation assembly (100) comprising:
a track (102) configured to be operatively fixed relative to the support structure (18) and comprising:
a first roller surface (104);
a second roller surface (106) opposite the first roller surface (104); and
a curved section (108), in which the first roller surface (104) and the second roller surface (106) are curved;
a carriage (110) configured to be operatively coupled to the flight control surface (50);
a first roller (112) rotatably supported by the carriage (110) and comprising a first-roller rolling surface (128) engaged with the first roller surface (104);
a second roller (114) rotatably supported by the carriage (110) and comprising a second-roller rolling surface (130) engaged with the second roller surface (106); and
an actuator (116) comprising:
a proximal end (120) configured to be operatively fixed relative to the support structure (18); and
a distal end (122) configured to be selectively translated away from and toward the proximal end (120), wherein the distal end (122) is operatively coupled to the carriage (110) to selectively translate the carriage (110) along the track (102) and thus to selectively translate the first roller (112) along the first roller surface (104) and the second roller (114) along the second roller surface (106).

A1. The actuation assembly (100) of paragraph A, wherein the track (102) has a width (118) between the first roller surface (104) and the second roller surface (106), and wherein within the curved section (108) the width (118) tapers.

A1.1. The actuation assembly (100) of paragraph A1, wherein within the curved section (108) the width (118) decreases away from the proximal end (120) of the actuator (116).

A1.2. The actuation assembly (100) of paragraph A1, wherein within the curved section (108) the width (118) increases away from the proximal end (120) of the actuator (116).

A2. The actuation assembly (100) of any of paragraphs A-A1.2, further comprising:
a third roller (126) rotatably supported by the carriage (110) and comprising a third-roller rolling surface (132) engaged with one of the first roller surface (104) or the second roller surface (106).

A2.1. The actuation assembly (100) of paragraph A2, wherein within the curved section (108) of the track (102), the first roller surface (104) is an outer surface of the curved section (108) and the second roller surface (106) is an inner surface of the curved section (108), and wherein the third-roller rolling surface (132) is engaged with the second roller surface (106).

A2.1.1. The actuation assembly (100) of paragraph A2.1, wherein axes of the first roller (112), the second roller (114), and the third roller (126) are fixed relative to the carriage (110) during operative translation of the carriage (110) along the track (102), and wherein the first-roller rolling surface (128) maintains operative engagement with the first roller surface (104) and the second-roller rolling surface (130) and the third-roller rolling surface (132) maintain operative engagement with the second roller surface (106) during operative translation of the carriage (110) along the curved section (108) of the track (102).

A2.3. The actuation assembly (100) of paragraph A2, wherein within the curved section (108) of the track (102), the first roller surface (104) is an outer surface of the curved section (108) and the second roller surface (106) is an inner surface of the curved section (108), and wherein the third-roller rolling surface (132) is engaged with the first roller surface (104).

A2.3.1. The actuation assembly (100) of paragraph A2.3, wherein axes of the first roller (112), the second roller (114), and the third roller (126) are fixed relative to the carriage (110) during operative translation of the carriage (110) along the track (102), and wherein the first-roller rolling surface (128) and the third-roller rolling surface (132) maintain operative engagement with the first roller surface (104) and the second-roller rolling surface (130) maintains operative engagement with the second roller surface (106) during operative translation of the carriage (110) along the curved section (108) of the track (102).

A2.4. The actuation assembly (100) of any of paragraphs A2-2.3.1, wherein axes of the first roller (112), the second roller (114), and the third roller (126) are arranged in an acute triangle.

A3. The actuation assembly (100) of any of paragraphs A-A2.4,
wherein the first roller surface (104) has a first-roller surface profile (134);
wherein the second roller surface (106) has a second-roller surface profile (136);
wherein the first-roller rolling surface (128) has a first-roller-rolling-surface profile (138) that corresponds to the first-roller surface profile (134);
wherein the second-roller rolling surface (130) has a second-roller-rolling-surface profile (140) that corresponds to the second-roller surface profile (136);
wherein one or both of:
the first-roller-rolling-surface profile (138) and the first-roller surface profile (134) are two-dimensional; or
the second-roller-rolling-surface profile (140) and the second-roller surface profile (136) are two-dimensional.

A3.1. The actuation assembly (100) of paragraph A3 when depending from paragraph A2, wherein the third-roller rolling surface (132) has a third-roller-rolling-surface profile (142) that corresponds to one of the first-roller-rolling-surface profile (138) or the second-roller-rolling-surface profile (140) with which the third-roller rolling surface (132) is engaged.

A3.2. The actuation assembly (100) of any of paragraphs A3-A3.1, wherein one or both of:
the first-roller-rolling-surface profile (138) and the first-roller surface profile (134) are V-shaped; or
the second-roller-rolling-surface profile (140) and the second-roller surface profile (136) are V-shaped.

A4. The actuation assembly (100) of any of paragraphs A-A3.2, wherein the track (102) further comprises a straight section (124).

A4.1. The actuation assembly (100) of paragraph A4, wherein the straight section (124) is proximal to the proximal end (120) of the actuator (116) relative to the curved section (108).

A4.2. The actuation assembly (100) of any of paragraphs A4-A4.1, wherein the track (102) has a/the width (118) between the first roller surface (104) and the second roller surface (106), and wherein within the straight section (124), the width (118) is constant.

A5. The actuation assembly (100) of any of paragraphs A-A4.2, further comprising:
a second track (202) configured to be operatively fixed relative to the support structure (18), parallel to and corresponding in shape to the track (102), and comprising:
a second-track first roller surface (204);
a second-track second roller surface (206) opposite the second-track first roller surface (204); and
a second-track curved section (208), in which the second-track first roller surface (204) and the second-track second roller surface (206) are curved;
a second-track first roller (212), coaxial with the first roller (112), rotatably supported by the carriage (110), and comprising a second-track first-roller rolling surface (228) engaged with the second-track first roller surface (204); and
a second-track second roller (214), coaxial with the second roller (114), rotatably supported by the carriage (110), and comprising a second-track second-roller rolling surface (230) engaged with the second-track second roller surface (206).

A5.1. The actuation assembly (100) of paragraph A5 when depending from paragraph A2, further comprising:
a second-track third roller (226), coaxial with the third roller (126), rotatably supported by the carriage (110), and comprising a second-track third-roller rolling surface (232) engaged with one of the second-track first roller surface (204) or the second-track second roller surface (206).

A5.1.1. The actuation assembly (100) of paragraph A5.1, wherein the second-track third-roller rolling surface (232) is engaged with the second-track second roller surface (206).

A5.1.1.1. The actuation assembly (100) of paragraph A5.1.1, wherein axes of the second-track first roller (212), the second-track second roller (214), and the second-track third roller (226) are fixed relative to the carriage (110) during operative translation of the carriage (110) along the second track (202), and wherein the second-track first-roller rolling surface (228) maintains operative engagement with the second-track first roller surface (204) and the second-track second-roller rolling surface (230) and the second-track third-roller rolling surface (232) maintain operative engagement with the second-track second roller surface (206) during operative translation of the carriage (110) along the second track (202).

A5.1.3. The actuation assembly (100) of paragraph A5.1, wherein the second-track third-roller rolling surface (232) is engaged with the second-track first roller surface (204).

A5.1.3.1. The actuation assembly (100) of paragraph A5.1.3, wherein axes of the second-track first roller (212), the second-track second roller (214), and the second-track third roller (226) are fixed relative to the carriage (110) during operative translation of the carriage (110) along the second track (202), and wherein the second-track first-roller rolling surface (228) and the second-track third-roller rolling surface (232) maintain operative engagement with the second-track first roller surface (204) and the second-track second-roller rolling surface (230) maintains operative engagement with the second-track second roller surface (206) during operative translation of the carriage (110) along the second track (202).

A6. Use of the actuation assembly (100) of any of paragraphs A-A5.1.3.1 to move the flight control surface (50) of the aircraft (10).

B. An aircraft (10), comprising:
a fuselage (40);
a wing (20) supported by the fuselage (40); and
a tail (30) supported by the fuselage (40);
wherein the wing (20) or the tail (30) comprises:
a support structure (18);
a flight control surface (50); and
the actuation assembly (100) of any of paragraphs A-A5.1.2, coupled to the support structure (18), wherein the carriage (110) of the actuation assembly (100) is operatively coupled to the flight control surface (50) for operative movement of the flight control surface (50) relative to the support structure (18).

B1. The aircraft (10) of paragraph B, wherein the flight control surface (50) is a flap (52).

C. A method of moving a flight control surface (50) of an aircraft (10), the method comprising:
rolling rollers (112, 114, 126) along opposing roller surfaces (104, 106) of a track (102) that comprises a curved section (108), wherein the flight control surface (50) is operatively coupled to the rollers (112, 114, 126).

C1. The method of paragraph C, wherein the track (102) has a width (118) between the opposing roller surfaces (104, 106) that, within the curved section (108), tapers.

C2. The method of any of paragraphs C-C1, wherein the track (102) further comprises a straight section (124).

C2.1. The method of paragraph C2 when depending from paragraph C1, wherein the width (118) decreases within the curved section (108) away from the straight section (124).

C2.2. The method of paragraph C2 when depending from paragraph C1, wherein the width (118) increases within the curved section (108) away from the straight section (124).

C3. The method of any of paragraphs C-C2.2, wherein the rollers (112, 114, 126) maintain operative engagement with the track (102) along the curved section (108).

C4. The method of any of paragraphs C-C3,
wherein the roller surfaces (104, 106) of the track (102) have roller-surface profiles (134, 136);
wherein rolling surfaces (128, 130, 132) of the rollers (112, 114, 126) have rolling-surface profiles (138, 140, 142);
wherein the roller-surface profiles (134, 136) and the rolling-surface profiles (138, 140, 142) are two-dimensional; and
wherein the roller-surface profiles (134, 136) correspond in shape to the rolling-surface profiles (138, 140, 142).

C4.1. The method of paragraph C4, wherein the roller-surface profiles (134, 136) and the rolling-surface profiles (138, 140, 142) are V-shaped.

C5. The method of any of paragraphs C-C4.1, wherein the flight control surface (50) is a flap (52).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An actuation assembly for moving a flight control surface of an aircraft relative to a support structure of the aircraft, the actuation assembly comprising:
   a track configured to be operatively fixed relative to the support structure and comprising:
      a first roller surface;
      a second roller surface opposite the first roller surface;
      a curved section, in which the first roller surface and the second roller surface are curved, wherein the track has a width between the first roller surface and the second roller surface, and wherein within the curved section the width tapers; and
      a straight section;
   a carriage configured to be operatively coupled to the flight control surface;
   a first roller rotatably supported by the carriage and comprising a first-roller rolling surface engaged with the first roller surface;
   a second roller rotatably supported by the carriage and comprising a second-roller rolling surface engaged with the second roller surface; and
   an actuator comprising:
      a proximal end configured to be operatively fixed relative to the support structure; and
      a distal end configured to be selectively translated away from and toward the proximal end, wherein the distal end is operatively coupled to the carriage to selectively translate the carriage along the track and thus to selectively translate the first roller along the first roller surface and the second roller along the second roller surface; and
   wherein the straight section of the track is proximal to the proximal end of the actuator relative to the curved section.

2. The actuation assembly of claim 1, wherein within the curved section the width decreases away from the proximal end of the actuator.

3. The actuation assembly of claim 1, wherein within the curved section the width increases away from the proximal end of the actuator.

4. The actuation assembly of claim 1, further comprising:
   a third roller rotatably supported by the carriage and comprising a third-roller rolling surface engaged with one of the first roller surface or the second roller surface.

5. The actuation assembly of claim 4, wherein within the curved section of the track, the first roller surface is an outer surface of the curved section and the second roller surface is an inner surface of the curved section, and wherein the third-roller rolling surface is engaged with the second roller surface.

6. The actuation assembly of claim 5, wherein axes of the first roller, the second roller, and the third roller are fixed relative to the carriage during operative translation of the carriage along the track, and wherein the first-roller rolling surface maintains operative engagement with the first roller surface and the second-roller rolling surface and the third-roller rolling surface maintain operative engagement with the second roller surface during operative translation of the carriage along the curved section of the track.

7. The actuation assembly of claim 4, wherein within the curved section of the track, the first roller surface is an outer surface of the curved section and the second roller surface is an inner surface of the curved section, and wherein the third-roller rolling surface is engaged with the first roller surface.

8. The actuation assembly of claim 7, wherein axes of the first roller, the second roller, and the third roller are fixed relative to the carriage during operative translation of the carriage along the track, and wherein the first-roller rolling surface and the third-roller rolling surface maintain operative engagement with the first roller surface and the second-roller rolling surface maintains operative engagement with the second roller surface during operative translation of the carriage along the curved section of the track.

9. The actuation assembly of claim 4, wherein axes of the first roller, the second roller, and the third roller are arranged in an acute triangle.

10. The actuation assembly of claim 1,
wherein the first roller surface has a first-roller surface profile;
wherein the second roller surface has a second-roller surface profile;
wherein the first-roller rolling surface has a first-roller-rolling-surface profile that corresponds to the first-roller surface profile;
wherein the second-roller rolling surface has a second-roller-rolling-surface profile that corresponds to the second-roller surface profile;
wherein one or both of:
the first-roller-rolling-surface profile and the first-roller surface profile are two-dimensional; or
the second-roller-rolling-surface profile and the second-roller surface profile are two-dimensional.

11. The actuation assembly of claim 10, further comprising:
a third roller rotatably supported by the carriage and comprising a third-roller rolling surface engaged with one of the first roller surface or the second roller surface, wherein the third-roller rolling surface has a third-roller-rolling-surface profile that corresponds to one of the first-roller-rolling-surface profile or the second-roller-rolling-surface profile with which the third-roller rolling surface is engaged.

12. The actuation assembly of claim 10, wherein one or both of:
the first-roller-rolling-surface profile and the first-roller surface profile are V-shaped; or
the second-roller-rolling-surface profile and the second-roller surface profile are V-shaped.

13. The actuation assembly of claim 1, wherein within the straight section, the width is constant.

14. An aircraft, comprising:
the actuation assembly of claim 1;
a fuselage;
a wing supported by the fuselage; and
a tail supported by the fuselage;
wherein the wing or the tail comprises:
the support structure; and
the flight control surface; and
wherein the actuation assembly is coupled to the support structure, and wherein the carriage of the actuation assembly is operatively coupled to the flight control surface for operative movement of the flight control surface relative to the support structure.

15. The aircraft of claim 14, wherein the flight control surface is a flap.

16. A method of moving a flight control surface of an aircraft relative to a support structure of the aircraft, the method comprising:
translating a distal end of an actuator that is operatively coupled to rollers relative to a proximal end of the actuator that is fixed relative to the support structure, wherein the translating comprises:
rolling the rollers along opposing roller surfaces of a track that comprises a curved section and a straight section, wherein the flight control surface is operatively coupled to the rollers, and wherein the straight section of the track is proximal to the proximal end of the actuator relative to the curved section.

17. An actuation assembly for moving a flight control surface of an aircraft relative to a support structure of the aircraft, the actuation assembly comprising:
a track configured to be operatively fixed relative to the support structure and comprising:
a first roller surface;
a second roller surface opposite the first roller surface;
a curved section, in which the first roller surface and the second roller surface are curved, wherein the track has a width between the first roller surface and the second roller surface, and wherein within the curved section the width tapers;
a second track configured to be operatively fixed relative to the support structure, parallel to and corresponding in shape to the track, and comprising:
a second-track first roller surface;
a second-track second roller surface opposite the second-track first roller surface; and
a second-track curved section, in which the second-track first roller surface and the second-track second roller surface are curved;
a carriage configured to be operatively coupled to the flight control surface;
a first roller rotatably supported by the carriage and comprising a first-roller rolling surface engaged with the first roller surface;
a second roller rotatably supported by the carriage and comprising a second-roller rolling surface engaged with the second roller surface;
a second-track first roller, coaxial with the first roller, rotatably supported by the carriage, and comprising a second-track first-roller rolling surface engaged with the second-track first roller surface; and
a second-track second roller, coaxial with the second roller, rotatably supported by the carriage, and comprising a second-track second-roller rolling surface engaged with the second-track second roller surface; and
an actuator comprising:
a proximal end configured to be operatively fixed relative to the support structure; and
a distal end configured to be selectively translated away from and toward the proximal end, wherein the distal end is operatively coupled to the carriage to selectively translate the carriage along the track and thus to selectively translate the first roller along the first roller surface and the second roller along the second roller surface.

18. The actuation assembly of claim 17, further comprising:
- a third roller rotatably supported by the carriage and comprising a third-roller rolling surface engaged with one of the first roller surface or the second roller surface; and
- a second-track third roller, coaxial with the third roller, rotatably supported by the carriage, and comprising a second-track third-roller rolling surface engaged with one of the second-track first roller surface or the second-track second roller surface.

19. The actuation assembly of claim 18, wherein the second-track third-roller rolling surface is engaged with the second-track second roller surface, wherein axes of the second-track first roller, the second-track second roller, and the second-track third roller are fixed relative to the carriage during operative translation of the carriage along the second track, and wherein the second-track first-roller rolling surface maintains operative engagement with the second-track first roller surface and the second-track second-roller rolling surface and the second-track third-roller rolling surface maintain operative engagement with the second-track second roller surface during operative translation of the carriage along the second track.

20. The actuation assembly of claim 18, wherein the second-track third-roller rolling surface is engaged with the second-track first roller surface, wherein axes of the second-track first roller, the second-track second roller, and the second-track third roller are fixed relative to the carriage during operative translation of the carriage along the second track, and wherein the second-track first-roller rolling surface and the second-track third-roller rolling surface maintain operative engagement with the second-track first roller surface and the second-track second-roller rolling surface maintains operative engagement with the second-track second roller surface during operative translation of the carriage along the second track.

* * * * *